Jan. 30, 1923. 1,443,904.
J. H. PARSONS.
OCCUPANT PROPELLED VEHICLE.
FILED SEPT. 19, 1921. 2 SHEETS—SHEET 1.
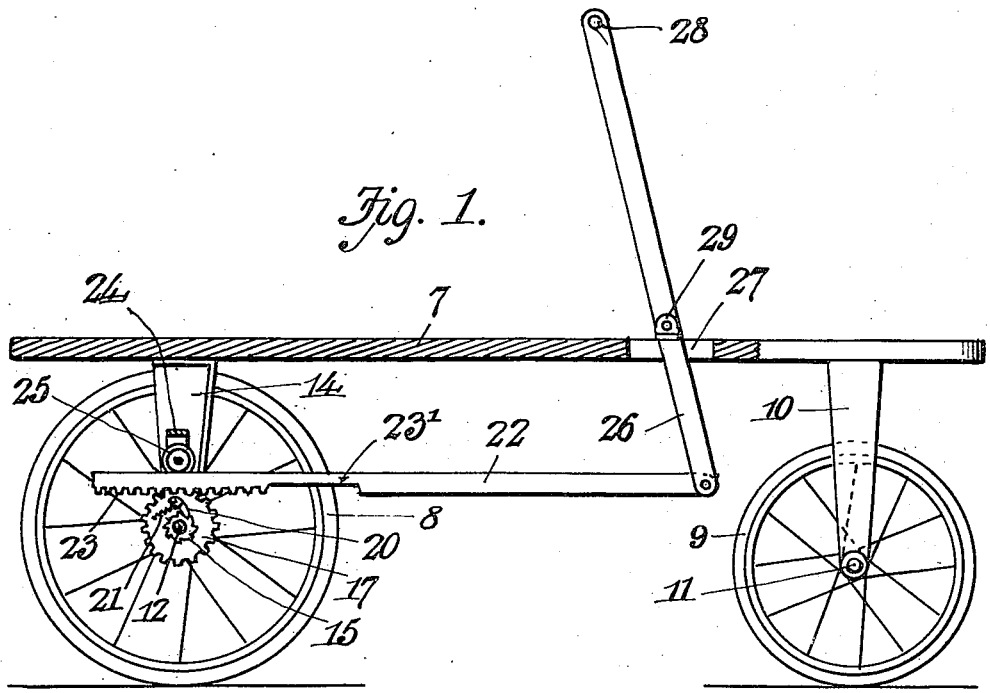
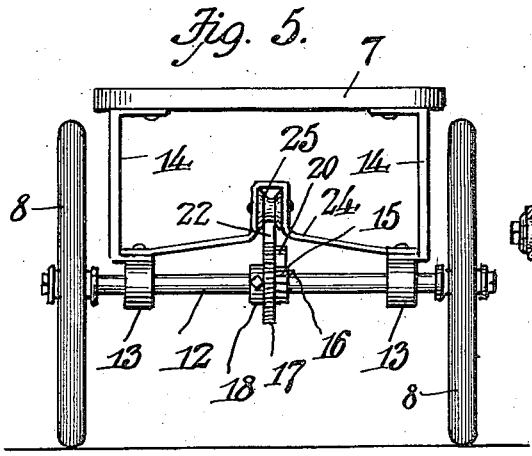
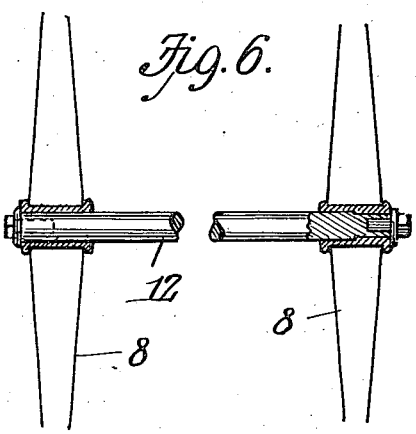
Inventor:
John H. Parsons,
By [signature],
Attorney.

Jan. 30, 1923.
J. H. PARSONS.
OCCUPANT PROPELLED VEHICLE.
FILED SEPT. 19, 1921.
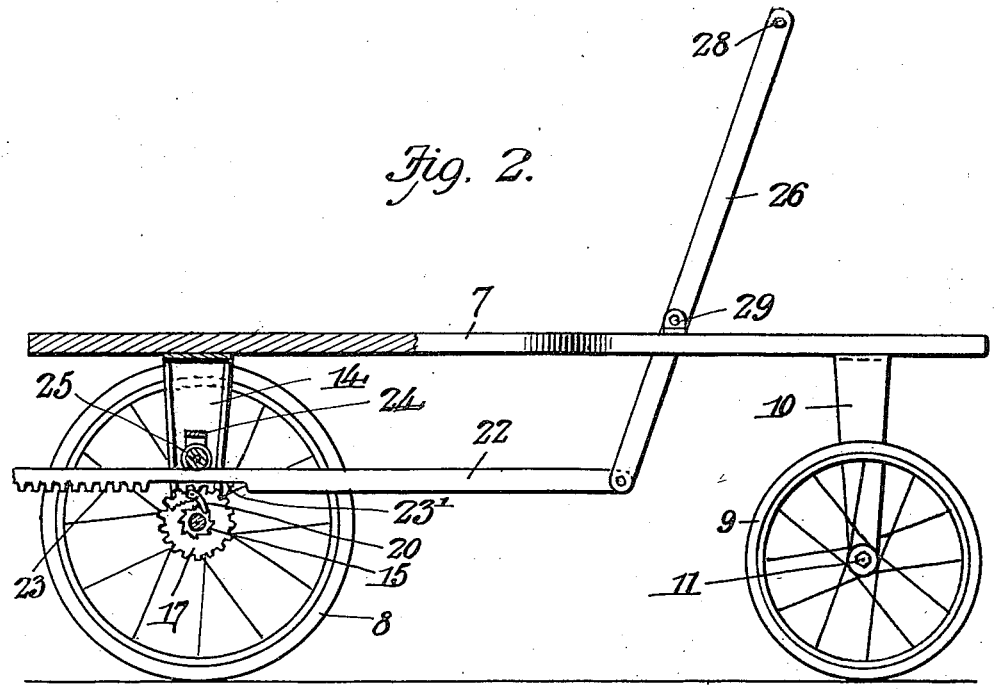
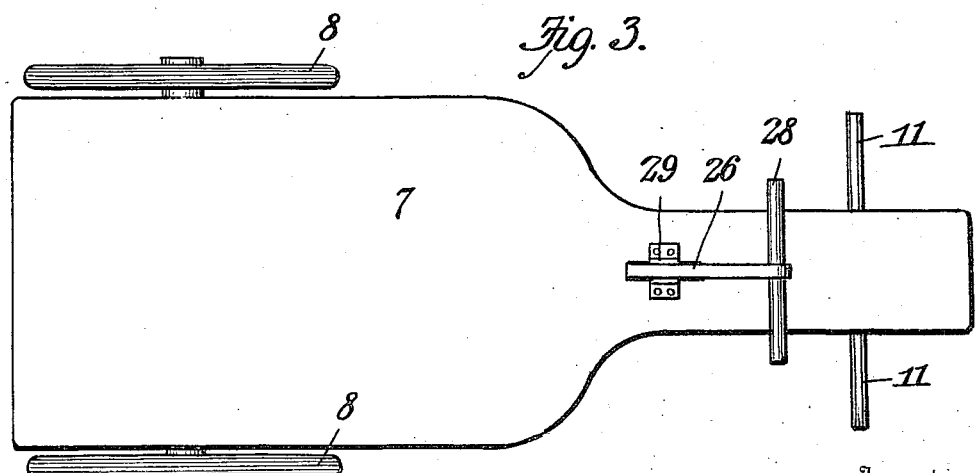
Inventor:
John H. Parsons, Patented Jan. 30, 1923.

1,443,904

UNITED STATES PATENT OFFICE.

JOHN H. PARSONS, OF RIDLEY PARK, PENNSYLVANIA, ASSIGNOR OF ONE-HALF TO JOSEPH H. HINKSON, OF RIDLEY PARK, PENNSYLVANIA.

OCCUPANT-PROPELLED VEHICLE.

Application filed September 19, 1921. Serial No. 501,637.

*To all whom it may concern:*

Be it known that I, JOHN H. PARSONS, a citizen of the United States, residing at Ridley Park, in the county of Delaware and State of Pennsylvania, have invented new and useful Improvements in Occupant-Propelled Vehicles, of which the following is a specification.

This invention relates to child's occupant-propelled vehicles, and particularly to that type of vehicle wherein the propulsion means includes a swinging lever adapted to be manipulated by the hands and arms of the occupant.

In vehicles of this type wherein the rocking lever is connected with the drive axle of the vehicle, it frequently happens that the child is injured in coasting by being struck by the lever when the latter moves rearwardly at a rapid rate, this being due to the fact that the propulsion means is positively connected to the drive axle and the lever therefore swings back and forth at a speed governed by the speed of the vehicle. Furthermore, in vehicles of the type mentioned, the power stroke of the rock lever is usually in the direction of forward travel of the vehicle, a pushing action of the occupant being necessary therefore to propel the vehicle in a forward direction. This is an objectionable feature, in that the occupant is compelled to exert a maximum pressure when its body is least braced, and also causes severe strains to the muscles of the child which should not be overtaxed. Furthermore, a rock lever positively connected with the drive axle is objectionable in instances where the occupant desires to reverse the direction of movement of the vehicle by pushing its feet upon the ground, and the lever frequently strikes and injures the child in such operations.

The general objects of the present invention are to overcome disadvantages incident to vehicles having the propulsion means positively connected to the drive axle, and these general objects, as well as others which will appear as the description proceeds, are attained by constructing the vehicle in the manner hereinafter pointed out, illustrated in the drawings and more specifically set forth in the claims.

In the drawings:

Figure 1 is a longitudinal section view taken through the vehicle constructed in accordance with the invention, Figure 2 is a similar view illustrating the lever advanced to such position as to disconnect the propelling means from the drive axle, Figure 3 is a top plan view of the improved vehicle, Figure 4 is a detail fragmentary sectional view illustrating the manner in which the drive gear and ratchet wheels are associated with the drive axle, Figure 5 is a rear elevation of the vehicle, and Figure 6 is a detail fragmentary sectional view illustrating the manner in which the drive wheels are associated with the drive axle.

Referring now more particularly to the drawings, 7 indicates the body of the vehicle, the same in the present instance including a board or platform of suitable length and breadth, supported at its rear end by the spaced drive wheels 8 and at its forward end by a single steering wheel 9. The steering wheel 9 is rotatably carried at the lower end of a bracket 10 depending from the forward end of the vehicle, this bracket being rotatable so as to permit the steering wheel to turn laterally, and the spindles of wheel 9 are extended at each side as at 11 to form foot rests for the vehicle occupant.

The drive wheels 8 are carried by drive axle 12 rotatably mounted in bearings 13 supported by brackets 14 arranged in spaced parallel relation and depending from the rear portion of platform 7. As shown more particularly in Figure 6 of the drawings, one of the drive wheels 8 is rotatable upon axle 12, while the other drive wheel is keyed, splined or in any other preferred manner rigidly secured to the said drive axle.

The drive axle has affixed thereto intermediate its ends a ratchet wheel 15, the same in the present instance being rigidly connected to the axle by means of a key 16. A gear 17 preferably somewhat larger than ratchet wheel 15 is rotatably carried by axle 12 adjacent to the said ratchet wheel; the latter limiting the gear against sliding movement longitudinally of the axle in one direction, while a collar 18 disposed upon the opposite side of the gear prevents the latter sliding in the opposite direction.

The collar 18 is affixed to the shaft by means of set screw 19. The gear 17 has pivoted thereto a pawl 20 having its free end engaged with the pivot of ratchet wheel 15, this engagement being yieldably maintained by spring 21. It is obvious from this construction that upon rotation of gear 17 in one direction the pawl 20 will become engaged with a flat face of the ratchet wheel, thus establishing a driving connection between the gear and the drive shaft. Rotation of gear 17 in the reverse direction will break this driving connection, as the pawl 20 will play idly over the several faces of the ratchet gear 15. Furthermore, the driving connection between the axle and gear will be broken should the axle assume a speed more rapid than that of the gear, as will be understood. In the present instance the ratchet connection is such that the driving connection will be established when the gear 17 is rotating in a forward or clockwise direction.

The means for imparting rotative movement to gear 17 includes a rack bar 22. This rack bar is provided near its rear end with teeth 23 to mesh with the teeth of gear 17, and at the end of this series of teeth forwardly from the rear end of the bar there is provided a depressed portion 23' stripped of all teeth or obstructions which would engage the teeth of the gear 17. The rear portion of rack bar 22 is confined beneath a yoke 24 disposed laterally of the vehicle and secured at its ends to the opposing bracket members 14. This yoke is provided with a sheave or idler 25, the same bearing upon the upper edge of the rack bar and maintaining the latter engaged with the gear 17. The yoke 24 is formed of spring metal and exerts pressure in a downward direction, thereby maintaining roller 25 at all times engaged with the rack bar and holding the latter firmly upon gear 17.

The forward end of the rack bar is pivoted to the lower end of an operating lever indicated at 26. This lever extends downwardly through an opening 27 in platform 7 near the forward end of the said platform, and the upper end of the lever is provided with handle or grip members 28 to enable the occupant to grasp and manipulate the same. The lever 26 is pivoted upon the platform in brackets 29 as shown.

In operating the vehicle, the child seats itself upon the broadened portion of the platform with its feet resting upon the spindles 11 of the front or steering wheel. Steering operations of the vehicle may be carried on by exerting pressure alternately upon the opposing spindles. With the feet of the occupant thus braced, the hand grips 28 are grasped and the upper end of the lever 26 pulled rearwardly. This causes the rack bar 22 to be drawn forwardly beneath the vehicle body, the teeth 23 of the rack bar engaging the teeth of gear 17 and causing the latter to be rotated forwardly or in clockwise direction. This rotation of the drive gear causes pawl 20 to engage and lock with the flat faces of ratchet wheel 15, whereby a positive driving connection between the rack bar and drive axle is established. This propelling connection is only maintained when the upper portion of the lever is moving in a rearward direction, and may be more readily carried out by reason of the fact that the feet of the operator are firmly braced upon guide spindles 11. When the rear limit of this drive stroke has been reached, the forward end of the lever is moved forwardly, and it will be understood that during this movement the gear 17 will rotate in counter-clockwise direction, the pawl 20 thereof playing idly over the ratchet wheel 15. These alternate movements of the lever are continued by the child, it being understood that the driving connection will only be established during rearward swinging movement of the lever. Should it be desired to coast upon the vehicle, the operator may hold the lever stationary, thus halting rotation of gear 17 and enabling the drive axle to be free from any impediment. If desired, during the coasting operation, the upper portion of lever 26 may be moved to its intermediate forward position, bringing the depressed or gap portion 23' directly over gear 17.

When the occupant desires to back the vehicle, this may be done by placing the feet upon the ground and pushing rearward, while the gap or depressed portion 23' is disposed over gear 17. This permits the drive axle to move in counter-clockwise direction without in any way effecting the movement of rack bar 22.

From the foregoing it is obvious that I have provided a child's vehicle of extremely simple construction, which has its parts so constructed and assembled as to minimize the opportunity for breakage or derangement, which may be operated by the child with the least possible danger of injury to its occupant and which will prove thoroughly practical and efficient in use.

Having thus fully described my invention, I claim:—

1. In a vehicle, a drive axle, a gear carried by said axle and adapted when rotated in one direction to operatively engage the same, a rack bar having a toothed portion for engagement with the gear and a recessed portion in advance of said toothed portion to bridge and idly receive the gear when the rack bar is moved rearwardly beyond meshing position, a spring-pressed guide member engaging the bar and pressing it toward said gear, and means for actuating said bar.

2. In a vehicle, a drive axle, a gear carried by said axle and adapted when rotated in one direction to operatively engage said axle, a rack bar having a toothed portion to engage said gear and a recessed portion in advance of the toothed portion to idly bridge and receive the gear when said bar is moved rearwardly beyond meshing position, a guide roller engaging the rack bar, a spring yoke carried by said guide roller and operated to press the rack bar in engagement with the gear, and means for actuating said rack bar.

3. In a vehicle, a drive axle, a gear carried by said axle and adapted when rotated in one direction to operatively engage said axle, a rack bar engaged with said gear, and a yieldable yoke enclosing said rack bar and holding the latter engaged with said gear.

4. In a vehicle, a drive axle, a gear carried by said axle and adapted when rotated in one direction to operatively engage said axle, a rack bar engaged with said gear, a spring yoke spanning said bar, and a roller carried by said yoke and engaging said bar.

5. In a vehicle, a frame, drive and steering axles on said frame, a gear loosely mounted on said drive axle, a pawl and ratchet connection between said gear and drive axle, a rack bar having its teeth normally engaged with the teeth of said gear, a spring yoke supported by said frame and spanning said rack bar, a roller carried by said yoke and engaging said rack bar, a lever pivoted upon said frame, and a connection between said lever and said rack bar.

In testimony whereof I affix my signature.

JOHN H. PARSONS.